May 7, 1935. J. H. COHEN 2,000,743
ELECTRICAL DEVICE FOR AUTOMOBILES
Filed Dec. 29, 1932
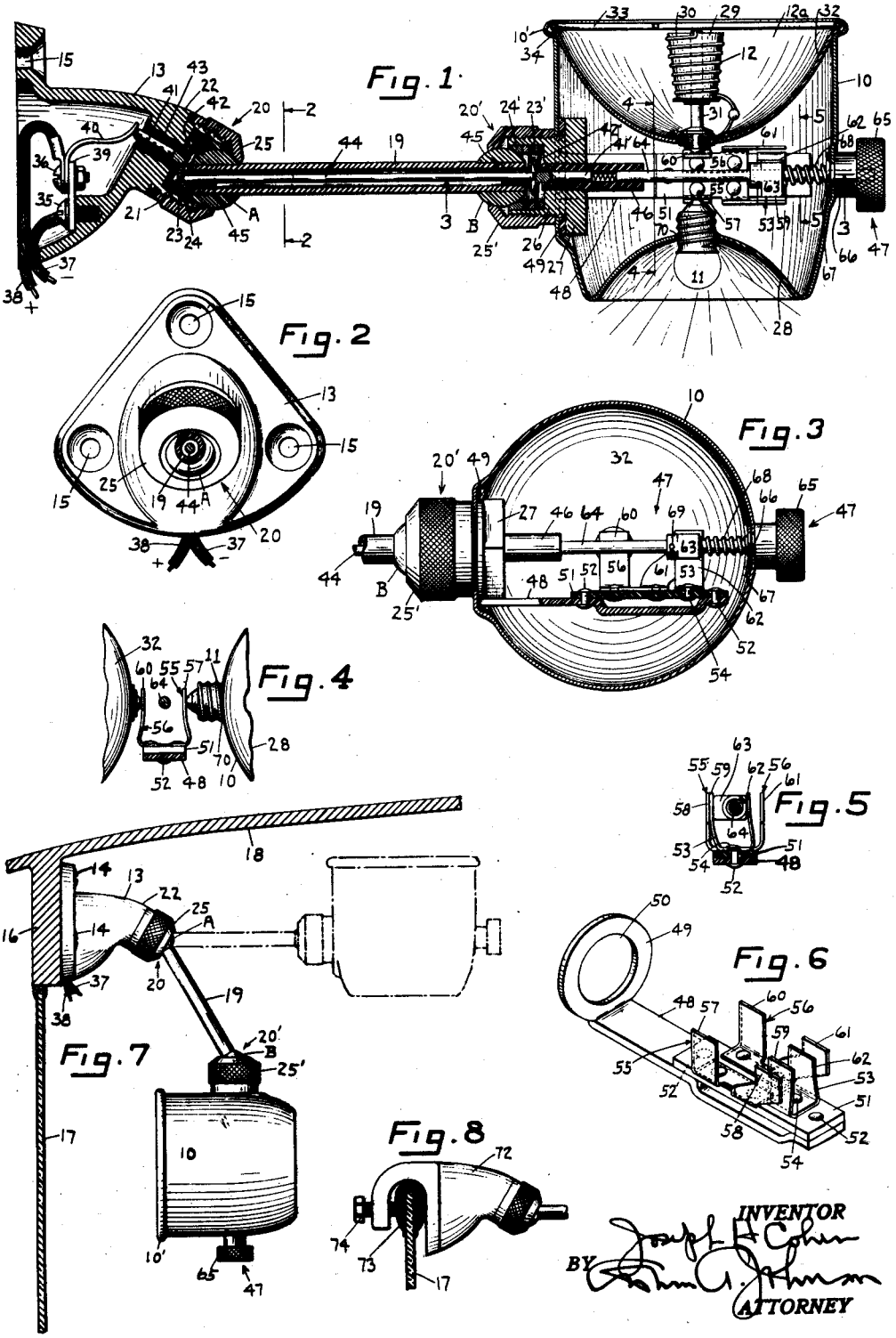

Patented May 7, 1935

2,000,743

UNITED STATES PATENT OFFICE 2,000,743

ELECTRICAL DEVICE FOR AUTOMOBILES

Joseph H. Cohen, Bridgeport, Conn.

Application December 29, 1932, Serial No. 649,277

7 Claims. (Cl. 240—7.1)

This invention relates to electrical devices for use in automobiles.

An object of the present invention is to provide a combined windshield heater and reading lamp and suitable mounting therefor, so that ordinarily the device may be used to illuminate the driver's compartment; but, when occasion requires, it may be used to heat the windshield sufficiently to prevent the formation of ice or the accumulation of snow on the exterior surface thereof.

A further object of this invention is to provide an improved reading lamp for the driver's compartment of an automobile which, being mounted near the ceiling and being adjustable, may have the rays of light emanating from the lamp directed to the desired place in the driver's compartment, so that the driver or the occupant of the seat next to the driver may consult his watch, maps, or the like while driving along at night.

Other features and advantages will hereinafter appear.

In the drawing—

Figure 1 is a longitudinal sectional view showing the device of the present invention.

Fig. 2 is a transverse sectional view, taken on line 2—2, Fig. 1.

Fig. 3 is a sectional view through the casing or device head of the present invention, taken on line 3—3, Fig. 1.

Fig. 4 is a fragmentary view, taken on line 4—4, Fig. 1.

Fig. 5 is a fragmentary view, similar to Fig. 4, taken in the direction of the arrows 5—5, Fig. 1.

Fig. 6 is a perspective view of the switch contact and support of the present invention.

Fig. 7 is a fragmentary view, on a reduced scale, showing the device of the present invention applied to the inside of a car.

Fig. 8 is a view of a modified form of bracket.

The combined lamp and windshield heater of the present invention, in the form at present preferred, comprises a hollow approximately cylindrical casing 10. At one end there is provided a lamp 11 while at the other end there is located a heating element 12. The lamp may be enclosed if desired, but for reasons explained below, it is preferable to have both the lamp and heater open to the atmosphere.

The casing 10 is supported by a bracket 13 which may be secured by screws 14 passing through holes 15 to the header board 16 of the car body which extends across the body directly over a windshield 17 and usually fills the space between the windshield and the ceiling 18 of the driver's compartment.

The casing 10 is not mounted directly on the bracket, but is secured to a rod 19, the other end of which is secured to the bracket, and the length of the rod and connections thereof to the bracket and casing are such that the casing may be swung toward the windshield 17, as shown in full lines in Fig. 7, into proximity to the portion thereof through which the driver usually looks, so that this portion or other desired portions, of the windshield may be kept sufficiently warm by heat generated by the heating element 12 to prevent the formation of ice or the accumulation of snow on the outside surface of the windshield.

According to the present invention, moreover, the length of the rod 19 and its connections to the bracket 13 and casing 10 are such that the casing may be swung up to a position, for instance close to the ceiling 18 of the car as shown in dot-and-dash lines in Fig. 7, in which position the lamp 11 will serve as an auxiliary light in the driver's compartment.

The need for such an auxiliary light in the driver's compartment has been felt by motorists practically ever since the coming into vogue of closed cars, and especially since the common use of indirect lighting of the instrument panel, for it is not infrequent that the driver or the passenger next to the driver desires to consult his watch, maps, or other informatory things, without taking the time to stop the car near a road, or other light. Further, the need for such a light was frequently felt when procuring tools or other things stored under the front seat. The need recently has been evidenced through the provision by some manufacturers of what might be termed a make-shift solution of the problem by providing on the instrument panel a sleeve carrying an auxiliary lamp which could be pulled out toward the seat next to the driver. Being so low, however, such devices are inconvenient and unsatisfactory to use.

It would be a comparatively simple matter to put a dome light in the driver's compartment for this purpose. But, besides the extra cost which such an additional light would add to the cost of the automobile, the dome light in the driver's compartment is not satisfactory because the light therefrom would be spread over the windshield and, in many situations, prevent the driver from satisfactorily seeing the road.

The situation might be met by the provision of a separate light with a suitable reflector, but this is objectionable because the driver's compartment is already crowded with attachments and appurtenances. For instance, on the header board there is usually mounted the rear vision mirror, windshield lifting crank, a clock sometimes, a windshield wiper, and other things.

According to the present invention, the desire for a driving compartment light is met and satisfied in a particularly advantageous way since, as will be pointed out below, the light has a large range of adjustment, and, moreover, being combined with the windshield heater, does not require the addition of any extra and superficial attachment or part in the driver's compartment.

With the device of the present invention, the casing may be left in the position shown in dot-and-dash lines in Fig. 7, where the light may be used as desired in the day-in and day-out operation of the car. When, however, there is danger of sleet or an accumulation of snow forming on the windshield, the casing may be rotated and swung down into the position shown in full lines in Fig. 7, where the heating element 12 is brought into use.

In order to permit such movements of the casing 10 relative to the bracket 13 that either the lamp 11 or the heating element 12 may be brought into use and in order that the rays of light emanating from the lamp may be directed to the desired place within the driver's compartment and the heat from the heating element 12 directed to the desired place on the windshield, the lamp casing 10 and bracket 13 are connected to the rod 19 by ball-and-socket joints 20 and 20'.

In the broader aspects of this invention, any suitable form of ball-and-socket joint may be employed, but, as shown herein and as at present preferred, the rod 19 is provided at opposite ends with balls A and balls B. The ball A is located at the bracket side of the rod and fits in a cavity 21 within a neck 22 on the bracket. In this cavity there is a helical spring 23 and a shoe 24, the latter being shaped to conform to the surface of the ball. The ball is confined in the cavity by a cap 25 shaped to conform to and engage the surface of the ball at the exterior part of the ball A.

With this arrangement, the arm 19 may be swung in any direction until the arm hits the edge of the cap 25. The spring 23 presses the shoe 24 against the ball A with sufficient friction to hold the ball against casual movement.

The connection 20' including the ball B which is at the casing end of the arm 19 is substantially the same as that for the ball A, the only difference being that it is in a sleeve 26 formed entirely separate from the casing, the sleeve 26 having a head 27 located within the casing and the cap 25' extending to the casing 10 and drawing the head 27 firmly against the inside surface of the casing so as to not only secure the ball B, spring 23' and shoe 24' in the socket but also hold the sleeve to the casing. The casing is preferably made flat as shown in Fig. 3 at the place where the sleeve 26 and cap 25' are located.

From what has been said, it will be understood that the joints are sufficiently stiff to hold the casing in any desired position.

In the embodiment of the invention herein disclosed and as above indicated, it is preferable that both the heating element 12 and the lamp 11 be open to the atmosphere, and, in the preferred form of the invention, one side of the casing is made concave so as to form a light reflector 28 for the light emanating from the lamp to reflect the light in the desired direction.

In lieu of the conventional socket for holding the lamp 11, which may be convenient for a miniature base, the reflector is pierced so as to provide a single thread for engaging the thread on the lamp.

The heating element 12 is preferably mounted at the opposite end of the casing 10. It comprises an insulating body 29 having a winding of nichrome or other high resistance wire 30 and is mounted on a reduced stem 31 which retards conduction of heat from the heating element to the casing itself. The heating element may advantageously be provided with a reflector 32 so as to reflect the heat outwardly to the atmosphere on different lines in front of the heating element.

Should the reflector 28 for the lamp be made of a separate piece, then the reflector 32 for the heating element 12 may be formed integral with the casing 10. However, it is preferred that the reflector for the lamp be made integral with the casing and be left open for economy of manufacture and so that burnt out lamps may be changed readily; and, accordingly, in the form of the invention shown herein, the reflector 32 for the heating element 12 is made separate from the casing. As a matter of fact, and as constructed and shown herein, the reflector and heating element forms a separate unit 12a which is adjustably mounted on the casing. For this reason, the casing has an inwardly turned flange 10', and a conventional spring ring lock 33 is employed to engage in the flange and keep a flange 34 portion of the heat reflector 32 in its proper place in the casing.

Current, of course, must be conducted to the heating element 12 and lamp 11. For this purpose, in the form of the invention herein illustrated, the bracket 13 is provided with two wire binding or terminal screws 35 and 36 to which the feed wires 37 and 38 are connected. The feed wire 37 is electrically connected directly to the bracket and, as will appear below, forms a ground line leading to the casing. The binding post 36 for the other wire 38 is mounted on a piece of insulation 39 within a hollow space in the bracket and has connected to it a spring contact 40 electrically engaging a plunger 41 having a saucer-like head 42 lying in the cavity 21 of the bracket. The plunger 41 is insulated from the bracket by a fibre sleeve 43 and its head 42 is urged toward the ball A on the arm 19. Carried by the arm and projecting beyond the surface of the ball A is a rod or wire 44 adapted to be engaged by the head 42 of the plunger. The rod is mounted within the arm 19 in fibre sleeves 45 and it projects also beyond the end of the ball B at the casing 10. Here it is engaged with another plunger 41' having a saucer-shaped head 42'. This plunger is slidably mounted in an insulated sleeve 46 carried by the sleeve 26 for the ball B.

With this arrangement, it will be seen that current is conducted from the wire 38 through the contact 40, plunger 41, rod 44 and plunger 41' in all possible positions of the balls A and B in their sockets. Moreover, it will be understood that rotation of the casing 10 relative to the arm 19 and rotation of the latter relative to the bracket 13 may be effected without impairing the electrical connection between the terminal 36 on the bracket and the plunger 41' at the casing.

Accordingly, no care need be exercised in adjusting the casing of the present invention, such as would be necessary if current were conducted to the casing by means of a wire which would ultimately become twisted and break.

The casing 10 also provides a very satisfactory mount and housing for a switch 47 adapted to cut the heating element 12 or the lamp 11 into circuit at will. By having the switch in the casing difficulty which would be encountered by carrying two branches of the ungrounded side of the source of current from the bracket 13 is avoided.

Preferably, in its present preferred form, the switch comprises a bracket 48 having an offset 49 shaped substantially like a washer with a hole 50 adapted to be passed over the shank of the sleeve 26 and to be rigidly secured to the casing 10 when the nut 25' is tightened. A strip of insulation 51 is fastened to the bracket 48 with rivets 52 and it in turn insulatingly supports a U-shaped primary contact 53, which is secured in place by a rivet 54. The block also supports a pair of secondary contacts, comprising one contact 55 for the lamp 11 and one contact 56 for the heating element 12. The lamp contact is secured to the block with rivets and has a finger 57 adapted to be permanently engaged by the center contact of the lamp, and another finger 58 adapted to be alternately engaged by an arm 59 portion of the U-shaped primary contact. The heating unit contact 56 is quite similar, for it is likewise connected to the block and is provided with a finger 60 permanently engaging the center contact of the heating unit and is provided with an integral finger 61 adapted to be alternately engaged by a second arm 62 portion of the primary contact 53.

The primary contact 53 is normally clear of both the fingers 58 and 61; however, it is made of resilient material and is adapted to be moved into engagement with either of these fingers through the medium of an actuator 63 in the form of a rectangular cam block secured to a shaft 64 having a bearing connection at one end with the insulating sleeve 46 and at its other end is provided with an actuator knob 65 of insulating material having a shank 66 fitting within a hole portion of the casing 10 to maintain the metal shaft out of electrical engagement with the shell.

Assembly of the switch 47 within the casing 10 is very easily effected. The bracket 48 is merely passed over the threaded shank of the sleeve 26 at the time the connection 20' is secured to the casing and the actuator 63 is put in place by passing the rod 64 through the hole until the end slides into the end of the rod 64 and at the same time an insulating washer 67, spring 68, and cam 63 is slid onto the shaft. The knob 65 is preferably molded integral with the shaft and the cam 63 is preferably held in place with a cross pin 69. The spring 68 between the cam and the washer, which engages the inside of the casing 10, serves to hold the actuator in operative position within the casing.

Current is transmitted from the grounded terminal 35 through the bracket 13, joint 20, arm 44, and other joint 20', because of the metal to metal construction, directly to the casing 10 to form a grounded contact for the lamp 11 at the threaded sleeve 70 portion thereof which receives the screw shell of the lamp, and forms a grounded contact for the heating unit at the flange 10' portion thereof which forms a seat for the flange 34 of the heating unit.

Operation of the device is as follows: Current passes from the source of current through the wire 37 to the grounded terminal 35 thence through various parts of the device to the grounded contact 34 of the heating unit and grounded contact 70 of the lamp 11 as just described. The other leg of the circuit extends from the source of current through the wire 38 to the ungrounded terminal 36 thence through the spring 40, plunger 41 and 41' and the rods 44 and 64 to the actuator cam 63, the latter being normally in a neutral position between the arms 59 and 62 of the primary contact 53. Normally the device of the present invention is in an upper station with respect to the top of the car as shown in Figs. 1 and 7 with the lamp 11 and reflector 28 facing toward the inside of the car so that when lighted it will direct light rays downwardly on maps and reading matter held in a normal manner; for example, in the lap of a person seated in the front seat of a car.

In order to light the lamp 11, it is merely necessary to turn the knob 65 until the cam 63 moves the arm 59 portion of the primary contact 53 into engagement with the finger 58 of the secondary or lamp contact 55 to pass current from the actuator cam 63 through these parts to the center contact of the lamp. In order to open the circuit again, it is merely necessary to rotate the knob sufficiently to cause the actuator to again assume the neutral position.

When it is desired to defrost the windshield, it is merely necessary to swing the casing about its universal joints 20 and 20' substantially into the position shown by solid lines in Fig. 7 with the heat deflector 32 facing toward the windshield 17 in order to direct heat rays thereagainst. After the casing is so positioned the operator merely rotates the switch actuator knob 65 sufficiently to move the cam 63 into position to move the arm 62 of the primary contact into engagement with the finger 61 of the secondary or heater contact 56 to complete the electrical circuit to the heating element 12. Preferably, the knob 65 is provided with an arrow (not shown) on the back or outer end which faces in the direction of the lamp end of the casing when the cam is in position to close the circuit to the lamp, as shown in Fig. 1, and so that it points in the direction of the heating coil end of the casing when the cam 63 is positioned to close the circuit to the heating coil.

When the amount of sleet formed on the windshield is slight, it is preferable not to subject the windshield to a large amount of heat and the universal joints, provided by the present invention, make it a very easy matter to locate and maintain the heater unit at any desired point with respect to the windshield.

Also, these joints make it very convenient to adjust the lamp in various locations transversely and vertically with respect to the seats and people within the car. Relative to this latter aspect, it will be appreciated that the lamp 11 may be used to direct light rays longitudinally of the car while it is in the solid line position shown in Fig. 7, or the casing may be rotated so as to direct the light rays vertically toward the floor of the car while in the lower position thereby providing stronger illumination than when it is in the raised position adjacent the top. In either its raised or lowered position the lamp of the present invention may be tilted slightly so that the rays thereof will not strike the windshield, as occurs with usual flood lighting lamps located at the ceiling.

It is within the purview of this invention to have a bracket in the form of a clamp, adapted to hook onto any suitable projection on an automobile, for example, a clamp 72 as shown on a reduced scale in the modification disclosed in Fig. 7, which may be attached to the top metal rim or windshield frame 73 of a sport type car with clamping screws 74.

If the bracket 13 or the clamp 72 is mounted about midway between the driver's seat and that next to his, the device may be swung conveniently so as to serve as a source of illumination for either the driver or for the other occupant of the driver's compartment. Even when mounted in this position, when the device is swung down toward the windshield as shown in full-lines in Fig. 7, it may be used to warm first the part of the windshield in front of the driver and then it may be swung over to heat the windshield in front of the seat next to the driver. With the ball-and-socket joints between the bracket, arm, and casing, any satisfactory or desired distribution of heat or direction of light may be obtained. The ball-and-socket joints are so constructed that when swung to position toward the windshield, the shoulders on the socket will engage the arm 19 before any portion of the casing can engage the windshield thus preventing the windshield from accidentally being broken or chipped in the use of the device.

Variations and modifications may be made within the scope of this invention and portions of the improvements may be used without others.

Having thus described the invention, what is claimed as new and for which it is desired to obtain Letters-Patent, is:—

1. In a device of the character described, the combination of a support adapted to be connected to the header board in the driver's compartment of an automobile; an arm carried by the support; a casing carried by said arm, said casing having at one place thereon a heating element and at another place thereon a lamp; and a connection between the arm and the casing to permit rotation of the casing about the axis of said arm to bring either the heat from the heating element or light from the lamp to be directed to the desired place.

2. In a device of the character described, the combination of a support adapted to be connected to the header board in the driver's compartment of an automobile; an arm carried by the support; a casing carried by said arm, said casing having at one place thereon a heating element and at another place thereon a lamp; and a connection between the support and the arm to permit rotation of the casing about the axis of said arm to bring either the heat from the heating element or light from the lamp to be directed to the desired place.

3. In a device of the character described, a casing having at one place thereon a heating element and at another place thereon a lamp; means for supporting the casing in the driver's compartment of an automobile; and a connection between the casing and said supporting means providing for bodily rotation and angular adjustment of the casing relative to the supporting means to bring either the heater or the lamp into the desired position for use.

4. In a device of the character described, a casing having at one place thereon a heating element and at another place thereon a lamp; means for adjustably and rotatably supporting the casing in the driver's compartment of an automobile; a connection between the casing and said supporting means providing for bodily rotation and angular adjustment of the casing relative to the supporting means to bring either the heater or the lamp in the desired position for use; means for conducting current to the casing; and means for selectively connecting either the lamp or the heating element to the current conducting means.

5. In a device of the character described, a casing having at one place thereon a heating element and at another place thereon a lamp; means for adjustably and rotatably supporting the casing in the driver's compartment of an automobile; a connection between the casing and said supporting means providing for bodily rotation and angular adjustment of the casing relative to the supporting means to bring either the heater or the lamp in the desired position for use; means for conducting current to the casing; and means for connecting and disconnecting either the lamp or the heating element to said current conducting means.

6. A device of the character described, comprising a bracket; an arm; a ball-and-socket joint between said arm and said bracket; a lamp; a casing carried by said arm, said casing being of a cup-like shape and provided with an integral concave depression extending toward the inside center of the cup to form a reflector for the lamp; a heating unit; and a flange on the upper rim of said cup-like casing forming a locating and supporting shoulder for said heating unit.

7. A device of the character described, comprising a tubular casing; a lamp at one end of the casing; a heating unit at the other end of said casing; current supplying means extending to said lamp and to said heating unit; and supporting means for said casing including a bracket, an arm, and adjustable connections between the bracket, arm and casing adapted to carry the heating unit in a suspended position adjacent the windshield of the automobiles, said adjustable connections permitting the casing to be swung to a position adjacent the roof of the car and rotated to bring the lamp on the side of the casing into position for use.

JOSEPH H. COHEN.